United States Patent Office 3,121,347
Patented Feb. 18, 1964

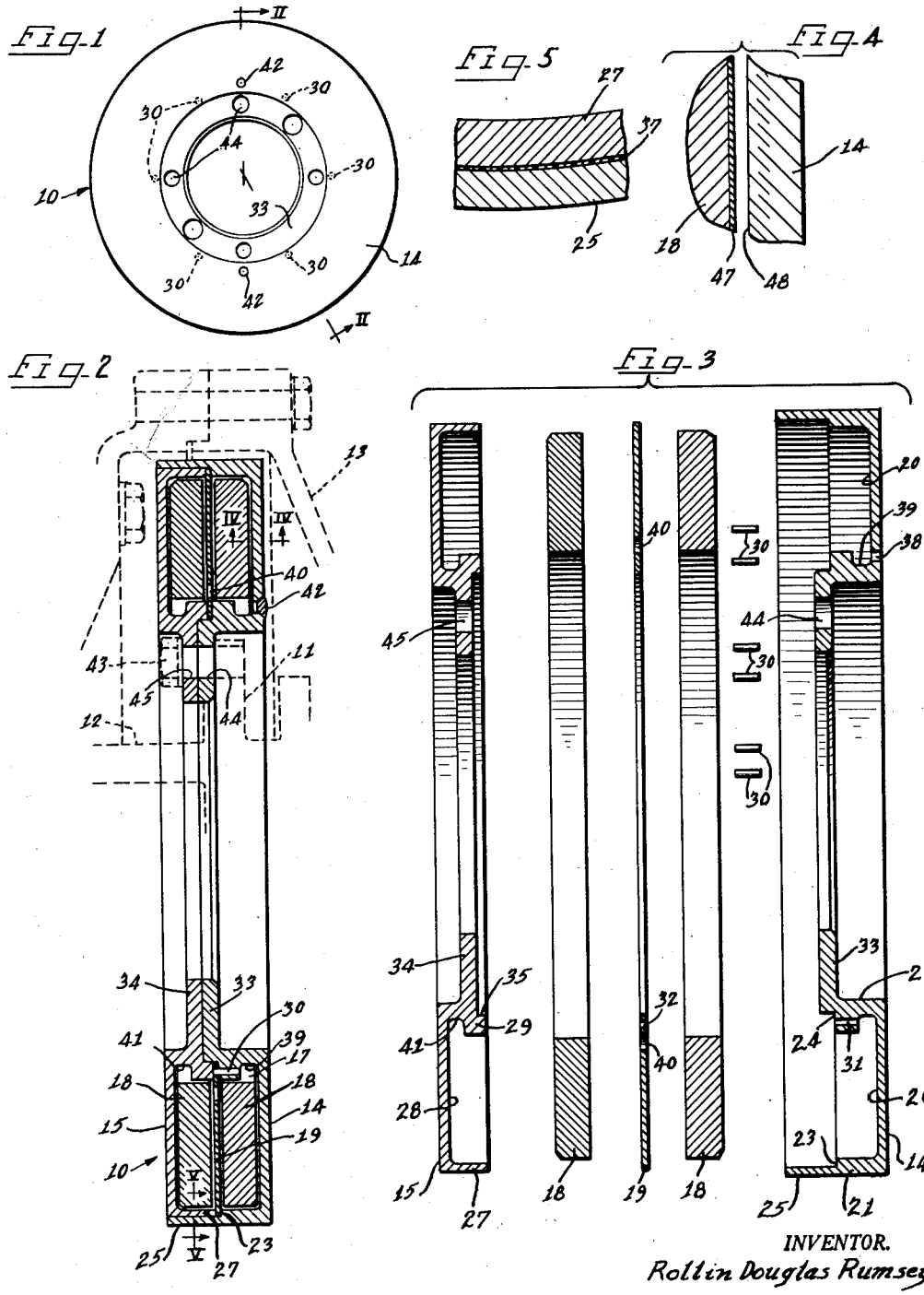

3,121,347
VISCOUS TORSIONAL VIBRATION DAMPER
Rollin Douglas Rumsey, Buffalo, N.Y., assignor to Houdaille Industries, Inc., Buffalo, N.Y., a corporation of Michigan
Filed Jan. 19, 1961, Ser. No. 83,687
15 Claims. (Cl. 74—574)

This invention relates to improvements in viscous torsional vibration dampers of the kind disclosed in patents heretofore issued to B. E. O'Connor, Nos. 2,514,136 and 2,514,139 and assigned to the same assignee as the present application. Such dampers are especially useful in overcoming the problem of torsional oscillations or vibrations in rotary masses of which crankshafts of rotating machinery including the crankshafts of internal combustion engines of the reciprocating piston type are a prime example.

For automobile engines, especially, it is desirable that maximum damping constant be attained at the lowest possible cost and weight per damper unit.

It is, accordingly, an important object of the present invention to provide an improved viscous torsional vibration damper of the type wherein the shear resistance of a viscous fluid between the closely spaced opposing surfaces of one or more flywheels and a flywheel casing is relied upon as a yieldable coupling between the opposed flywheel and casing surfaces.

Another object of the invention is to provide an efficient viscous torsional vibration damper of unusually large damping constant in a small size damper unit especially suitable for use on the crankshaft of a small size automobile engine.

A further object of the invention is to provide a viscous torsional vibration damper unit of improved lightweight.

Still another object of the invention is to provide a viscous torsional vibration damper which may satisfactorily be made from accurately cast lightweight metal parts, especially in the housing components of the unit.

Yet another object of the invention is to provide a viscous torsional vibration damper in which the opposing surfaces are treated in a novel way to prevent seizing or galling where silicone viscous fluid is utilized in the damper.

A still further object of the invention is to provide an improved viscous torsional vibration damper embodying novel means for sealing the housing components against leakage of viscous fluid therefrom.

Other objects, features and advantages of the present invention will be readily apparent from the following detailed description of a preferred embodiment thereof taken in conjunction with the accompanying drawing, in which:

FIGURE 1 is a small scale outer side elevational view of a viscous torsional vibration damper embodying features of the invention;

FIGURE 2 is an enlarged sectional detail view taken substantially on the line II—II of FIGURE 1;

FIGURE 3 is an exploded sectional detail view of the damper unit showing the several parts employed in the exemplary damper;

FIGURE 4 is a greatly enlarged fragmentary sectional detail view taken substantially on the line IV—IV of FIGURE 2;

FIGURE 5 is a greatly enlarged fragmentary sectional detail view taken substantially on the line V—V of FIGURE 2.

Referring to FIGURES 1 and 2, a damper unit 10 is depicted which is of generally ring or annular form adapting it especially for attachment to a suitable flange 11 of a crankshaft 12 of a reciprocating piston internal combustion engine such as an automobile engine, there being a suitable housing 13 within which the damper unit freely rotates with the crankshaft 12 to which the unit is fixedly attached.

According to the present invention, the damper 10 includes a pair of complementary housing or casing sections 14 and 15 defining therebetween a ring shaped chamber 17 within which is operatively enclosed a high inertia damping mass structure herein in the form of a pair of identical flywheels 18 each of which functions in approximately one-half of the chamber 17 segregated by a divider plate partition 19. All axially facing and outer peripheral opposed surfaces of the inertia members 18 and the casing within the chamber 17 are predetermined to be in shear film spaced relation to one another during full operating rotation of the damper 10 with the associated crankshaft, having regard to the viscous damping fluid within the chamber 17. A suitable viscous damping fluid comprises a selected silicone, a commercial example of which is identified as Dow-Corning type 510 having a viscosity rating of about 60,000 centistokes at 77° F.

In a satisfactory construction, the two housing components 14 and 15 are made from a lightweight material such as aluminum, zinc or magnesium in suitable alloy to enable die casting or plaster casting to such accuracy as to require little or no machining, especially in respect to the surfaces thereof providing the flywheel chamber. Accordingly, the housing component 14 comprises a cavity and flange section provided with an annular cavity 20 opening toward one axial side of the member (FIGS. 2 and 3) and defined by an outer peripheral flange portion 21 and an inner peripheral hub flange portion 22. To receive the dividing partition 19 the flange portions 21 and 22 are provided with respective but coplanar annular rabbet groove seats 23 and 24 which are parallel to and spaced from the axially facing inner surface defining the chamber recess 20 the proper distance to afford the desired shear film space relationship with respect to the opposing axially facing surfaces of the flywheel ring member housed within the chamber recess 20. Similarly, the diameters of the flange portions 21 and 22 inside the chamber recess 20 are properly dimensioned relative to the corresponding opposing diameters of the flywheel ring member to afford the desired shear film space relationship.

For embracing and closingly coacting with the companion housing unit 15, providing a complementary flywheel receiving cavity and flange section, the housing section 14 is provided with an axial flange extension 25 from the outer peripheral flange portion 21, within which an axially oppositely projecting outer peripheral flange portion 27 on the housing member 15 is embracingly received in a fairly close sliding fit. The flange portion 27 defines the outer perimeter of a flywheel chamber recess cavity 28, the inner perimeter of which is defined by a flange portion 29 concentric with the outer flange portion 27. It will be observed that the free edges of the flange portions 27 and 29 are coplanar for engagement flush against the opposing face of the partition plate 19. All dimensions within the annual cavity 28 are, similarly as described in respect to the cavity 20, dimensioned with respect to the flywheel 18 to afford substantially the same shear film spacing with respect to each of the opposed surfaces of the housing member and the flywheel.

In assembling the components of the damper, one of the flywheel members 18 is placed in the chamber cavity 20, then the dividing partition plate 19 is placed on the seats 23 and 24 and is secured fixedly corotatively with the housing section 14 as by means of a set of dowel pins 30, six being used herein, driven through and into registering bores 31 and 32 in respectively the flange portion 22 and the partition plate 19. Finally, the housing section member 15 with the remaining flywheel 18 in the chamber cavity 28 is assembled within the axial flange extension 25 of the housing section 14 with the coplanar free ends of the flanges 27 and 29 at least closely disposed contiguous the opposing margins of the partition plate 19.

In the fully assembled relationship, a radially inwardly projecting annular attachment flange extension 33 on the housing flange portion 22 of the housing member 14 substantially abuts a complementary radially inwardly projecting attachment flange extension 34 from the inner peripheral flange portion 29 of the housing member 15. To assist in maintaining concentricity of the housing members 14 and 15 an annular recessed shoulder 35 is provided in the flange portion 29 of the housing member 15 to receive the end of the flange portion 22 about and projecting axially beyond the partition receiving shoulder 24. Thus concentricity assurance is provided not only by such inner peripheral telescoped relationship but also by the outer peripheral telescoped relationship of the flange portions 25 and 27. In order to provide leak-proof joints between the housing sections 14 and 15, all lapping surfaces of the sections including the opposing lapping surfaces of the flange portions 25 and 27 and of the attachment flanges 33 and 34 are provided with permanent cementing and sealing material exemplified in FIGURE 5 at 37. Satisfactory results have been experienced where the cementing material has been a polyester or epoxy resin which are characterized by chemical inertness and high heat resistance. There is some preference for the epoxy type cement-sealer because of the good adhesion and very low shrinkage on curing properties thereof. These cements are thermosetting and will resist deterioration at the temperatures to which a damper of the present kind may be subjected in use on an automotive engine crankshaft. The overlapping surfaces of the flanges 25 and 27 and of the flanges 33 and 34 are coated with the resin cement and the housing parts, together with the flywheels and the partition member, are then assembled together and subjected to curing heat. For example, the epoxy resin adhesive compound is cured by subjecting the assembly to a temperature of 350° F. for about two hours. In order to provide accurate spacing of from 2½ to 5 mils between the lapping surfaces, glass threads may be sparsely distributed in the adhesive film. It is desirable to maintain the proper spacing in order to assure a good bond and uniform sealing.

After the assembly has been completed and sealed, the viscous fluid chamber 17 is filled by introducing the viscous fluid, preferably a silicone through one of a pair of filler openings 38, air evacuating through another such opening which may be disposed diametrically across from the opening 38 through which the fluid is introduced. As best seen in FIG. 3, the filler opening 38 is located to register with a reservoir groove 39 in the flange portion 22 adjacent to the axial wall defining the chamber recess 20. By having the partition plate 19 provided with a plurality of apertures 40 in its inner margin passage of the viscous fluid from the chamber recess 20 of the housing member 14 having the filler opening to the chamber recess 28 is assured. By virtue of the passage apertures 40, equalization of the viscous fluid is assured in the two portions of the flywheel chamber divided by the partition plate 19. It will be observed that a reservoir groove 41 is provided in the flange portion 29 of the housing member 15, as a counterpart of the groove 39 in the housing member 14. After filling of the damper unit has been completed, the filler openings 38 are permanently sealed by means of plugs 42 welded thereover.

In service, torsional stresses on the resin sealed joints are avoided by virtue of attaching screws 43 extending through aligned screw holes 44 and 45 in the overlapping attachment flanges 33 and 34, respectively. Not only do the mounting or attaching screws 43 hold the housing corotative with the associated shaft but they also hold the hub attachment flanges 33 and 34 firmly clamped together.

Although the housing components, including the complementary housing sections 14 and 15, and the thin divider partition plate 19 are desirably made from lightweight material such as aluminum, the inertia mass flywheel members 18 must be made from a material of greater specific gravity, and in a practical form they have been made from bronze castings, zinc alloy die castings also being feasible. These materials provide generally incompatible surfaces in the presence of silicone fluid thus subjecting the opposed parts to seizing or galling and thus defeating the vibration damping effect desired by the free floating of the flywheel members in the shear film coupling viscous fluid. Surface compatibility is attained by treating the opposing surfaces. Desirably, the flywheel members 18 are nickel or copper plated as indicated at 47 in FIG. 4. The surfaces defining the respective chamber recesses 20 and 28 are subjected to a hardening treatment, anodizing of the surfaces as at 48 in FIG. 4 having been found highly satisfactory where the housing members are made from aluminum or magnesium. The anodizing process consists in electrolytic oxidation of the part surface thus coating it with a hard oxide layer, in the case of aluminum being aluminum oxide which is an extremely hard substance. It might also be mentioned that zinc plating of the flywheel members is also satisfactory.

Although for purposes of illustration, the spacing between the surfaces of the flywheel members 18 and the enclosing housing surfaces has been shown in exaggerated form, in practice in a damper unit 10 having an outside diameter of about 6½ inches and a total thickness of about .875 inch, a desirable shear film spacing is on the order of .008–.009 inch. In view of such close spacing and thus liability of the free floating flywheel members to engage against opposing surfaces within the housing in response to unusual movements of the associated machine, and during idle periods, the plating and hardening of surfaces as described are of substantial importance.

In operation, as the damper 10 rotates with the associated shaft 12 centrifugal force causes the silicone damping fluid in the chamber 17 to equalize the respective positions of the flywheel rings 18 in their respective subchambers both as to concentricity and axial disposition. As a result the shear film spaces between the surfaces of the flywheel rings and the opposing surfaces of the housing within the chamber afford substantially uniform thin films of the viscous damping fluid and the flywheel rings are compelled to travel corotatively with the damper housing and thus with the rotating shaft.

Although the shear film coupling phenomenon has been thoroughly explained in the O'Connor patents hereinbefore referred to, for ready reference herein it may be stated that the viscous fluid is present between the opposing parallel working surfaces of the flywheel members and the housing in films which are thicker than a mere lubricating film but which are of less thickness than a layer which will produce only a fluid drag relationship. Stated another way, the shear film of viscous fluid is the result of an essentially linear velocity gradient spacing between the opposing parallel working surfaces of the members with relation to the viscosity of the damping fluid rather than a non-linear velocity gradient relationship. As the shaft 12 tends to oscillate or vibrate in operation, the same characteristics of the viscous fluid which compel rotation of the flywheel members with the housing of the damper also resist relative torsional oscillatory or vibrational movements of the flywheel members and the housing and thus of the shaft superimposed upon the normal rotation of the shaft. The force necessary to shear the viscous film between the flywheel surfaces and the adjacent work surfaces of the housing is proportional to the relative angular velocity between the flywheel and the housing work surfaces. The optimum proportion of the resistance of the viscous shear film to the moment of inertia of the flywheel member in each instance is easily calculated for any specific installation.

In the present instance, by having two independent flywheel members 18 substantial additional shear film coupling and thus resistance to relative torsional movements of the flywheel members and the housing is attained by virtue of the working surfaces provided by the thin dividing partition 19 opposing in each instance one of the largest area working surfaces of the flywheel ring member. Increased damping efficiency of this damper, therefore enables it to be made in relatively small size in proportion to the work load.

Even though centrifugal pressures of substantial magnitude develop within the damper chamber 17 in service, the long axial joint between the overlapping flanges 25 and 27 of the housing sections at the outer periphery of the damper unit, extending normal to the direction of centrifugal force assures maximum resistance to leakage. In this instance it will be observed that this outer peripheral joint extends the full width of the housing section 15 which is telescoped within the flange 25.

Great resistance to leakage through the hub joint of the damper 10 is, of course, assured not only by the substantial radial extent of the coextensive overlapping hub flanges 33 and 34, but also by the telescopic portion of the joint within the inset 35 of the housing section 15, the permanent cementing and sealing material 37 assuring freedom from leakage, assisted by the clamping effect of the mounting screws 43 in service. Furthermore, by virtue of such positive securement of the housing sections 14 and 15 by not only the joint sealing and cementing material 37, but also by the mounting screws 43 clamping the same together against the mounting flange 11 of the crankshaft, no other securing means are needed for the telescoped complementary housing sections 14 and 15.

It will be understood that modifications and variations may be effected without departing from the scope of the novel concepts of the present invention.

I claim as my invention:

1. In a viscous vibration damper, a housing defining a sealed chamber, a plurality of independent inertia members in said chamber, partition means separating said chamber into sub-chambers within which said inertia members are individually housed and separated from one another, said housing and said partition means providing within said sub-chambers working surfaces and the inertia members having working surfaces parallel to said working surfaces of the housing and in operative shear film spaced relation thereto, and viscous damping fluid in said sub-chambers affording shear films between the opposed working surfaces, said partition means having passage apertures therein for free equalization flow of the viscous fluid between the sub-chambers.

2. In a viscous torsional vibration damper, a pair of complementary housing sections of generally ring form having opposed annular axially opening complementary chamber recesses, said sections having outer peripheral telescopically connected flanges and hub portions overlappingly related and secured together, and inertia mass means housed within said chamber recesses.

3. In a viscous torsional vibration damper, a pair of complementary housing sections of generally ring form having opposed annular axially opening complementary chamber recesses, said sections having outer peripheral telescopically overlapping and connected flanges and hub portions overlappingly related and secured together, a partition plate fixedly mounted between said sections and separating said chamber recesses, independent inertia masses housed within the separated chamber recesses, and pin means securing said partition plate corotative with said housing sections.

4. In a viscous torsional vibration damper, a pair of complementary housing sections of generally ring form having opposed annular axially opening complementary chamber recesses, said sections having outer peripheral telescopically connected flanges and hub portions overlappingly related and secured together, one of said sections having respective coplanar axially facing seats at the mouth of the chamber recess therein, a partition plate seated on said seats and secured corotatively relative thereto and separating the chamber recesses into separate chamber portions within the assembly, and respective inertia mass members within said chamber recesses.

5. In a viscous torsional vibration damper, a pair of complementary housing sections of generally ring form having opposed annular axially opening complementary chamber recesses, said sections having outer peripheral telescopically connected flanges and hub portions overlappingly related and secured together, one of said sections having respective coplanar axially facing seats at the mouth of the chamber recess therein, a partition plate seated on said seats and secured corotatively relative thereto and separating the chamber recesses into separate chamber portions within the assembly, respective inertia mass members within said chamber portions, viscous damping fluid in said chamber portions affording a viscous coupling for said inertia members, and said partition plate having a plurality of small holes in its periphery adjacent to said hub portions for free equalization flow of the fluid between said chamber portions.

6. In a vibration damper, a pair of opposed complementary damper housing sections, said sections having integral respective oppositely extending telescopically overlapping joint flange portions in closely adjacent relation, resinous sealer and cement bonding said overlapping flange portions permanently together, said sections defining an inertia mass chamber therebetween, inertia mass means within said chamber, and viscous coupling fluid in the chamber between the surfaces of the inertia mass means and the surfaces defining said chamber and sealed against escape through said joints by said resinous sealer and cement.

7. In a viscous torsional vibration damper unit, a pair of complementary generally ring shaped housing sections providing therebetween an annular chamber cavity, said sections having oppositely projecting telescopically related outer peripheral flanges and inner peripheral hub portions, said outer peripheral flanges and hub portions having overlappingly adjoining joint surfaces, sealing and cementing material selected from polyester and epoxy resins permanently bonding said surfaces together and sealing the joints therebetween and thereby comprising the sole securing means holding the housing sections together as a unit.

8. In a viscous torsional vibration damper unit, a pair of complementary generally ring shaped housing sections having opposed annular chamber cavity recesses defined by outer peripheral flanges and inner peripheral hub portions, said outer peripheral flanges and hub portions having overlappingly adjoining joint surfaces, sealing and cementing material selected from polyester and epoxy resins permanently bonding said surfaces together and sealing the joints therebetween and thereby comprising the sole securing means holding the housing sections together as a unit, the adjoining surfaces of the outer peripheral flanges extending axially in telescoped relation, and the hub portions having both axially extending telescopically overlapping joint surfaces and radially extending overlapping hub flanges providing opposed joint surfaces.

9. In a viscous torsional vibration damper unit, a pair of complementary generally ring shaped housing sections having opposed annular chamber cavity recesses defined by outer peripheral flanges and inner peripheral hub portions, said outer peripheral flanges and hub portions having overlappingly adjoining joint surfaces, sealing and cementing material selected from polyester and epoxy resins permanently bonding said surfaces together and sealing the joints therebetween and thereby comprising the sole securing means holding the housing sections together as a unit, said hub portion surfaces including axially extending and radially extending portions with said radially extending portions being on radially extending overlapping flanges having aligned screw holes to receive a screw therethrough by which the unit is adapted to be secured to the flange of a crankshaft and said overlapping flanges clamped together by the screw working against the crankshaft flange.

10. In a viscous vibration damper, a housing made from lightweight metal and defining an inertia mass chamber therein, an inertia mass within said chamber and having working surfaces thereof in parallel shear film spaced relation to working surfaces of the housing within the chamber, silicone viscous damping fluid in said chamber affording shear films of the fluid in the spaces between the parallel opposed working surfaces, said metal of the housing and the material of the inertia mass being normally incompatible in the presence of the silicone fluid, the working surfaces of the housing within the chamber being provided with a wear and abrasion resistant coating, and said inertia mass having the working surfaces thereof plated with a material affording substantial compatibility with the opposed housing surface coating in the presence of the silicone fluid.

11. In a viscous vibration damper, a housing comprising aluminum alloy and defining an inertia mass chamber, an inertia mass of bronze material in said housing and having working surfaces thereof in parallel shear film spaced relation to opposing complementary working surfaces of the housing within said chamber, silicone viscous coupling damping fluid in said chamber and affording shear films between said working surfaces, the working surfaces of the housing within the chamber carrying an anodized coating of aluminum oxide, and the working surfaces of said inertia mass carrying a plating selected from nickel, zinc and copper.

12. In a viscous damper structure of the character described, an aluminum alloy housing defining an inertia mass chamber, a thin plate aluminum alloy partition separating said housing into a pair of subchambers and being fixed to the housing, bronze inertia mass members in the respective subchambers and having working surfaces thereof in parallel shear film spaced relation to opposed working surfaces of the housing and of the partition plate within said subchambers, viscous silicone coupling damping fluid in said subchambers and affording shear films of the fluid between said working surfaces, said surfaces of the housing within the chambers and of the partition plate carrying an anodized aluminum oxide coating, said inertia mass members carrying on the working surfaces thereof plating selected from nickel, zinc and copper.

13. In a viscous torsional vibration damper,
 a pair of complementary housing sections of generally ring form having opposed annular axially opening complementary chamber recesses,
 said sections having outer peripheral telescopically connected flanges and hub portions overlappingly related,
 resinous cement and sealer securing said flanges and hub portions together in fluid tight relation and against separation,
 inertia mass means housed within said chamber recesses,
 and a viscous coupling fluid in said chamber recesses between said inertia mass means and the surfaces defining said recesses.

14. In a vibration damper including a pair of opposed complementary damper housing sections defining a chamber therebetween,
 inertia mass means within the chamber,
 viscous coupling fluid in the chamber between the surfaces of the inertia mass means and the surfaces defining the chamber,
 said sections having overlapping joint surfaces,
 resinous sealer and cement bonding said overlapping surfaces permanently together and providing a seal against escape of the coupling fluid through the joint,
 and glass threads sparsely distributed in the sealer and cement and affording a substantially accurate spacing on the order of 2½ to 5 mils between said overlapping surfaces.

15. In a torsional vibration damper structure,
 a pair of complementary housing sections telescopically assembled and secured together and defining therebetween a circular chamber,
 a partition plate disposed between said sections and dividing said chamber into a pair of sub-chambers,
 one of said sections having a seat engaged marginally by said plate,
 a set of dowel pins securing the plate margin to said seat to maintain the plate corotative with said one section,
 respective circular inertia mass members in said sub-chambers and separated by said partition plate,
 and a coupling medium operatively coupling the inertia mass members to opposing surfaces of the partition plate and the housing sections within said sub-chambers.

References Cited in the file of this patent

UNITED STATES PATENTS

| | | |
|---|---|---|
| 1,719,805 | Hammond | July 2, 1929 |
| 2,210,372 | Kolb | Aug. 6, 1940 |
| 2,585,382 | Guernsey | Feb. 12, 1952 |
| 2,987,938 | Burch | June 13, 1961 |

FOREIGN PATENTS

| | | |
|---|---|---|
| 736,808 | Great Britain | Sept. 14, 1955 |